US009024727B1

(12) United States Patent
Otis et al.

(10) Patent No.: US 9,024,727 B1
(45) Date of Patent: May 5, 2015

(54) UTILIZING OSCILLATOR FREQUENCY DIVIDER SETTINGS AS A TEMPERATURE SENSOR IN RADIO FREQUENCY APPLICATIONS

(71) Applicant: Google Inc., Mountain View, CA (US)

(72) Inventors: Brian Patrick Otis, Sunnyvale, CA (US); Nathan Pletcher, Mountain View, CA (US); Daniel Yeager, Berkeley, CA (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 13/901,981

(22) Filed: May 24, 2013

(51) Int. Cl.
| | |
|---|---|
| *G08C 19/16* | (2006.01) |
| *H04Q 5/22* | (2006.01) |
| *G08B 13/14* | (2006.01) |
| *H04B 5/00* | (2006.01) |
| *H04M 1/00* | (2006.01) |
| *G01S 3/02* | (2006.01) |
| *G06K 7/10* | (2006.01) |
| *H01H 3/16* | (2006.01) |
| *G01K 5/72* | (2006.01) |
| *H01Q 3/36* | (2006.01) |
| *G08B 25/10* | (2006.01) |

(52) U.S. Cl.
CPC ........... *G06K 7/10366* (2013.01); *H01H 3/166* (2013.01); *G01K 5/72* (2013.01); *H01Q 3/36* (2013.01); *G08B 25/10* (2013.01)

(58) Field of Classification Search
USPC ................. 340/10.1, 572.1, 636.18, 588, 494, 340/870.01, 8.1, 505; 455/41.1, 41.2, 106, 455/558; 342/450
See application file for complete search history.

(56) References Cited

U.S. PATENT DOCUMENTS

| | | | | |
|---|---|---|---|---|
| 4,075,632 | A | * | 2/1978 | Baldwin et al. ................. 342/51 |
| 6,894,572 | B2 | * | 5/2005 | Heide et al. .................... 331/74 |
| 2007/0205916 | A1 | | 9/2007 | Blom et al. |
| 2008/0211562 | A1 | * | 9/2008 | Moreaux et al. ............. 327/292 |
| 2011/0032081 | A1 | * | 2/2011 | Wild .......................... 340/10.42 |
| 2013/0021193 | A1 | * | 1/2013 | Hermsen et al. ............... 342/51 |

FOREIGN PATENT DOCUMENTS

GB          GP2445829 A     7/2008

* cited by examiner

*Primary Examiner* — Fekadeselassie Girma
(74) *Attorney, Agent, or Firm* — McDonnell Boehnen Hulbert & Berghoff LLP

(57) ABSTRACT

Methods and systems for utilizing oscillator frequency divider settings as a temperature sensor are described herein. An example method may involve a reader device transmitting an RF signal to a tag device that includes an electronic oscillator configured to generate an oscillator signal with an oscillator frequency and a frequency adjuster configured to adjust the oscillator frequency with a frequency adjustment factor to provide a resulting frequency, the oscillator frequency being dependent on a temperature of the tag device and the resulting frequency being based on a reference frequency provided by the RF signal. The method may also involve the reader device receiving data from the tag device, the data being indicative of the oscillator frequency. The method may further involve the reader device determining an estimate of the temperature of the tag device based on at least the received data and a predetermined relationship between temperature and oscillator frequency.

20 Claims, 5 Drawing Sheets

UTILIZING OSCILLATOR FREQUENCY DIVIDER SETTINGS AS A TEMPERATURE SENSOR IN RADIO FREQUENCY APPLICATIONS

BACKGROUND

Unless otherwise indicated herein, the materials described in this section are not prior art to the claims in this application and are not admitted to be prior art by inclusion in this section.

Radio-frequency identification (RFID) systems implement wireless transference of data utilizing radio-frequency (RF) electromagnetic fields. Such systems may include a reader device, often referred to as an "interrogator," and a tag device, often referred to as a "label." In some scenarios, RFID tag devices can be included in objects in order to identify and/or track the objects using the reader device.

RFID systems can be classified by whether the tag device is "active" or "passive." In an example system, a reader device may transmit an RF interrogator signal to a passive tag device, thereby directing the passive tag device to reply to the interrogator signal by transmitting an information signal back to the reader device.

SUMMARY

In a first aspect, a method is provided. The method includes transmitting, by a reader device, a radio frequency (RF) signal to a tag device, where the tag device includes an electronic oscillator configured to generate an oscillator signal with an oscillator frequency and further includes a frequency adjuster configured to adjust the oscillator frequency with a frequency adjustment factor to provide a resulting frequency, where the oscillator frequency is dependent on a temperature of the tag device, and where the resulting frequency is based on a reference frequency provided by the RF signal. The method also includes receiving, by the reader device, data from the tag device, where the data from the tag device comprises data indicative of the oscillator frequency. The method also includes determining, by the reader device, an estimate of the temperature of the tag device based on at least the data and a predetermined relationship between temperature and oscillator frequency.

In a second aspect, a computing device is provided. The computing device comprises a radio frequency (RF) transceiver unit, at least one processor, and a memory, where the memory stores instructions that upon execution by the at least one processor cause the computing device to perform operations. The operations comprise transmitting, via the RF transceiver unit, a RF signal to a tag device, where the tag device includes an electronic oscillator configured to generate an oscillator signal with an oscillator frequency and further includes a frequency adjuster configured to adjust the oscillator frequency with a frequency adjustment factor to provide a resulting frequency, where the oscillator frequency is dependent on a temperature of the tag device, and where the resulting frequency is based on a reference frequency provided by the RF signal. The operations also comprise receiving, via the RF transceiver unit, data from the tag device, where the data from the tag device comprises data indicative of the oscillator frequency. The operations also comprise determining an estimate of the temperature of the tag device based on at least the data and a predetermined relationship between temperature and oscillator frequency.

In a third aspect, a non-transitory computer readable medium having stored instructions is provided. The instructions are executable by a computing device to cause the computing device to perform functions. The functions include transmitting a radio frequency (RF) signal to a tag device, where the tag device includes an electronic oscillator configured to generate an oscillator signal with an oscillator frequency and further includes a frequency adjuster configured to adjust the oscillator frequency with a frequency adjustment factor to provide a resulting frequency, where the oscillator frequency is dependent on a temperature of the tag device, and where the resulting frequency is based on a reference frequency provided by the RF signal. The functions also include receiving data from the tag device, where the data from the tag device comprises data indicative of the oscillator frequency. The functions also include determining an estimate of the temperature of the tag device based on at least the data and a predetermined relationship between temperature and oscillator frequency.

These as well as other aspects, advantages, and alternatives, will become apparent to those of ordinary skill in the art by reading the following detailed description, with reference where appropriate to the accompanying drawings.

DETAILED DESCRIPTION

Figure 1:
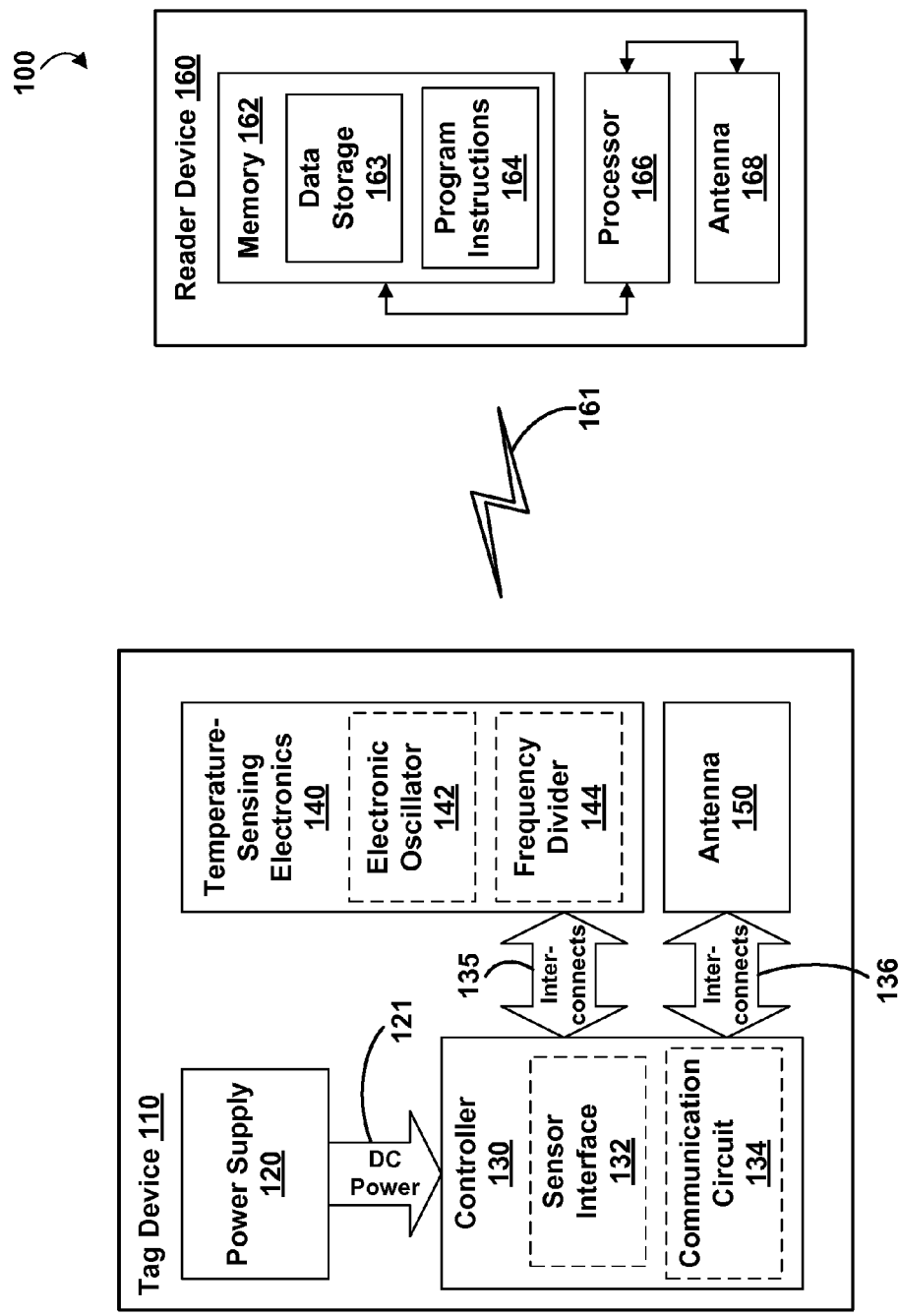
FIG. 1 is a block diagram of a system with a tag device in wireless communication with a reader device, according to an example embodiment.

The following detailed description describes various features and functions of the disclosed systems and methods with reference to the accompanying figures. In the figures, similar symbols typically identify similar components, unless context dictates otherwise. The illustrative method and system embodiments described herein are not meant to be limiting. It will be readily understood that certain aspects of the disclosed methods and systems can be arranged and combined in a wide variety of different configurations, all of which are contemplated herein.

I. Overview

Electronic circuits can be used to detect a temperature of a given device that includes the electronic circuit. For instance, such circuits can be included in devices as small as a contact lens in order to detect the temperature of the contact lens. Once the temperature is detected, digital data representing the detected temperature can be sent to a reader device. This process can require sensors and circuitry dedicated to temperature sensing and signal conditioning.

Sensors and circuitry dedicated to temperature sensing and signal conditioning can consume excessive power, can take up excessive space if implemented in small devices, and can be undesirably expensive. However, temperature of a given device can be estimated without use of complex circuitry. In an example embodiment, the given device may be a tag device that includes an electronic oscillator. The tag device can be in communication with a reader device, and the reader device may be configured to transmit a radio frequency (RF) signal to the tag device. Further, the reader device can be configured to modulate the RF signal such that the modulated RF signal from the reader device can provide a reference frequency for the tag device. The tag device, such as an RF identification (RFID) tag, may also include a frequency divider circuit that generates an output frequency based on the reference frequency. In order to generate the output frequency, the frequency divider may divide an oscillator frequency of the electronic oscillator by a frequency ratio (often referred to as a "frequency divider ratio"). In some embodiments, the reference frequency may be a calibrated internal clock frequency of the reader device, though other reference frequencies are possible.

Further, the oscillator frequency of the electronic oscillator may be dependent on a temperature of the tag device (e.g., the temperature of the electronic oscillator). For example, as the temperature of the tag device increases, the oscillator frequency of the electronic oscillator may increase as well. When the tag device receives the modulated RF signal from the reader device and obtains the reference frequency from the modulated RF signal, a controller in the tag device may adjust the frequency divider applied to the oscillator frequency so as to produce an output frequency that is within a certain close range of the reference frequency (e.g., such that the output frequency is within a predetermined range of the reference frequency). In this way, the frequency divider circuit can produce an output frequency that substantially matches the reference frequency. The adjustment made to the oscillator frequency—indicated by the frequency ratio—can then be used by the reader device in order to infer the temperature of the tag device.

The inferred temperature of the tag device may be based on a predetermined relationship between varying temperatures of the tag device and varying oscillator frequencies of the tag device, such as a relationship represented by a calibration curve. In one example, an effective calibration curve can be obtained by calibrating the electronic oscillator at least once at room temperature, though other calibration methods are possible. Further, various modifications can be made to the electronic oscillator in order for the reader device to obtain accurate temperature readings from it, so as to configure the electronic oscillator to have its oscillator frequency be dependent on only one variable.

II. Example Communication System

FIG. 1 is a block diagram of a system 100 that includes a tag device 110 in wireless communication with a reader device 160. The tag device 110 may include a power supply 120, a controller 130, temperature-sensing electronics 140, and a communication antenna 150. The tag device may also include other electronics not shown in FIG. 1. The temperature-sensing electronics 140 are operated by the controller 130. The power supply 120 (e.g., a rectifier/regulator component of the power supply 120) supplies and rectifies/regulates operating voltages, such as a DC supply voltage 121, to the controller 130 and/or the temperature-sensing electronics 140. The antenna 150 is operated by the controller 130 to communicate information to and/or from the tag device 110.

In some embodiments, the power supply 120 may be coupled to (or include) one or more batteries (not shown). The one or more batteries may be rechargeable and each battery may be recharged via a wired connection between the battery and a power supply 120 and/or via a wireless charging system, such as an inductive charging system that applies an external time-varying magnetic field to an internal battery.

In some embodiments, the power supply 120 may be configured to harvest ambient energy to power the controller 130 and the temperature-sensing electronics 140. For example, the power supply 120 may include an RF energy-harvesting antenna configured to capture energy from incident radio radiation provided by the reader device 160. Moreover, the tag device 110 may receive all of its operating energy from an RF signal transmitted by the reader device 160. Additionally or alternatively to the RF energy-harvesting antenna, the power supply 120 may include solar cell(s) ("photovoltaic cells") configured to capture energy from incoming ultraviolet, visible, and/or infrared radiation. Other embodiments are also possible.

The controller 130 is turned on when the DC supply voltage 121 is provided to the controller 130, and the logic in the controller 130 operates the temperature-sensing electronics 140 and the antenna 150. The controller 130 can include logic circuitry, such as a sensor interface module 132, configured to operate the temperature-sensing electronics 140 so as to interact with a surrounding environment of the tag device 110.

The controller 130 can also include a communication circuit 134 for sending and/or receiving information via the antenna 130. The communication circuit 134 can optionally include one or more oscillators, mixers, frequency injectors, etc. to modulate and/or demodulate information on a carrier frequency to be transmitted and/or received by the antenna 150. In some examples, the tag device 110 is configured to indicate an output from the temperature-sensing electronics 140 by modulating an impedance of the antenna 150 in a manner that is perceivable by the reader device 160. For example, the communication circuit 134 can cause variations in the amplitude, phase, and/or frequency of backscatter radiation from the antenna 150, and such variations can be detected by the reader device 160. In some embodiments, after the reader device 160 transmits an RF signal to the tag device 110, the reader device 160 can receive indications of results from the temperature-sensing electronics 140 (e.g., data indicative of the frequency ratio, the oscillator frequency of the electronic oscillator 142, and/or other data) transmitted back to the reader device 160 by the backscatter radiation, the backscatter radiation being at a given frequency.

The controller 130 is connected to the temperature-sensing electronics 140 via interconnects 135. For example, where the controller 130 includes logic elements implemented in an integrated circuit to form the sensor interface module 132, a patterned conductive material (e.g., gold, platinum, palladium, titanium, copper, aluminum, silver, metals, combinations of these, etc.) can connect a terminal on the chip to the temperature-sensing electronics 140. Similarly, the controller 130 is connected to the antenna 150 via interconnects 136.

It is noted that the block diagram shown in FIG. 1 is described in connection with functional modules for convenience in description. However, embodiments of the tag device 110 can be arranged with one or more of the functional modules ("sub-systems") implemented in a single chip, integrated circuit, and/or physical component. For example, the functional blocks in FIG. 1 shown as the power supply block 120 and controller block 130 need not be implemented as physically separated modules. Moreover, one or more of the functional modules described in FIG. 1 can be implemented by separately packaged chips electrically connected to one another.

The temperature-sensing electronics 140 may include an electronic oscillator 142. The electronic oscillator 142 may include a relaxation oscillator, such as a ring oscillator, or a particular modification of the relaxation oscillator. It should be understood that while the present application describes using the electronic oscillator 142 for temperature sensing, the electronic oscillator 142 can be configured to be sensitive to other parameters, such as light, movement, and humidity, in addition to or alternatively to temperature. As such, the electronic oscillator 142 can be used to estimate parameters not just of the tag device 110, but of the tag device's surrounding environment.

The temperature-sensing electronics 140 may also include a frequency divider circuit 144. The frequency divider circuit 144 may include a standard frequency divider configured to generate an output signal of a frequency based on an input signal of a frequency. For example, the tag device 110 may generate an RF signal of a resulting frequency based on the oscillator frequency of the electronic oscillator 142. The resulting frequency may also be based on an RF signal of a reference frequency transmitted by the reader device 160. In some embodiments, the frequency divider circuit 144 of the tag device 110 may be a component of a frequency synthesizer system configured to generate any resulting frequency that is within a given range of frequencies (e.g., a resulting frequency equal to the reference frequency and/or a resulting frequency within an optimal range of frequencies for the tag device 110 to operate at). The given range may be based on the type of tag device (e.g., high-frequency RFID tag or ultra-high-frequency RFID tag). The resulting frequency may be generated from a single oscillator, such as the electronic oscillator 142. Further, the resulting frequency can be generated by the frequency synthesizer system based on frequency multiplication, frequency division, and/or frequency mixing. In some embodiments, the temperature-sensing electronics 140 may include a frequency adjuster component other than a frequency divider circuit, which may use a type of frequency adjustment factor to adjust/correct the oscillator frequency.

It should be understood that while the electronic oscillator 142 and the frequency divider circuit 144 are illustrated as components of the temperature-sensing electronics 140, such components may be used to sense other parameters additionally or alternatively to sensing temperature. Moreover, the electronic oscillator 142 and the frequency divider circuit 144 may have other functionalities related to the operation of the tag device 110 other than sensing parameters such as temperature, and thus the description of their functions should not be limited to the description herein.

The reader device 160 includes an antenna 168 (or a group of more than one antennae) to send and receive wireless signals, such as RF signals, to and from the tag device 110. The reader device reader 160 also includes a computing system with a processor 166 in communication with a memory 162. The memory 162 is a non-transitory computer-readable medium that can include, without limitation, magnetic disks, optical disks, organic memory, and/or any other volatile (e.g. RAM) or non-volatile (e.g. ROM) storage system readable by the processor 166. The memory 162 can include a data storage 163 to store indications of data, such as sensor readings, program settings (e.g., to adjust behavior of the tag device 110 and/or the reader device 160), etc. The memory 162 can also include program instructions 164 for execution by the processor 166 to cause the reader device 160 to perform processes specified by the instructions 164. For example, the program instructions 164 can cause the reader device 160 to provide a user interface that allows for retrieving information communicated from the tag device 110 (e.g., outputs from the temperature-sensing electronics, such as frequency divider ratios, internal frequencies, and/or temperature readings of the tag device). The reader device 160 can also include one or more hardware components for operating the antenna 168 to send and receive the wireless signals to and from the tag device 110. For example, oscillators, frequency injectors, encoders, decoders, amplifiers, filters, etc. can drive the antenna 168 according to instructions from the processor 166.

The reader device 160 can be a smart phone, digital assistant, or other portable computing device with wireless connectivity sufficient to provide the wireless communication link 161. The reader device 160 can also be implemented as an antenna module that can be plugged in to a portable computing device, such as in an example where the communication link 161 operates at carrier frequencies not commonly employed in portable computing devices. In some embodiments, the tag device 110 may be implemented in an eye-mountable device (e.g., a contact lens) so as to sense a temperature of the eye-mountable device. In such embodiments, the reader device 160 may be configured to be worn relatively near a wearer's eye to allow the wireless communication link 161 to operate with a low power budget. For example, the reader device 160 can be integrated in eyeglasses, jewelry, or integrated in an article of clothing worn near the head, such as a hat, headband, etc.

In some embodiments, the tag device 110 and reader device 160 include one or more wireless interfaces so as to communicate with each other using a radio-frequency ID (RFID) protocol. For example, the tag device 110 and reader device 160 can communicate with each other in accordance with a Gen2 ultra-high frequency (UHF) RFID protocol, under which the system 100 operates in a frequency range of 860 MHz to 960 MHz. Further, under the Gen2 UHF RFID protocol, the system 100 may be a passive-backscatter system in which the reader device 160 transmits information to the tag device 110 by modulating an RF signal in the 860 MHz to 960 MHz frequency range. Still further, the passive tag device 110 can receive its operating energy from the RF signal, as noted above, and can modulate the reflection coefficient of its antenna in order to backscatter a signal to the reader device 160 (after being directed to do so by the reader device 160, e.g., an "interrogator-talks-first" system). Other RFID protocols are also possible.

In some embodiments, the system 100 can operate to non-continuously ("intermittently") supply energy to the tag device 110 to power the controller 130 and temperature-sensing electronics 140 (e.g., a passive system). For example, RF radiation can be supplied to power the tag device 110 long enough to carry out a temperature measurement of the tag device 110 and communicate the results. Further, the supplied RF radiation can be considered an interrogation signal from the reader device 160 to the tag device 110 to request a measurement. By periodically interrogating the tag device 110 (e.g., by supplying RF radiation to temporarily turn the device on) and storing the data used to infer the temperature of the tag device 110 (e.g., via the data storage 163), the reader device 160 can accumulate a set of temperature measurements over time without continuously powering the tag device 110.

III. Example Methods and Scenarios

Figure 2:
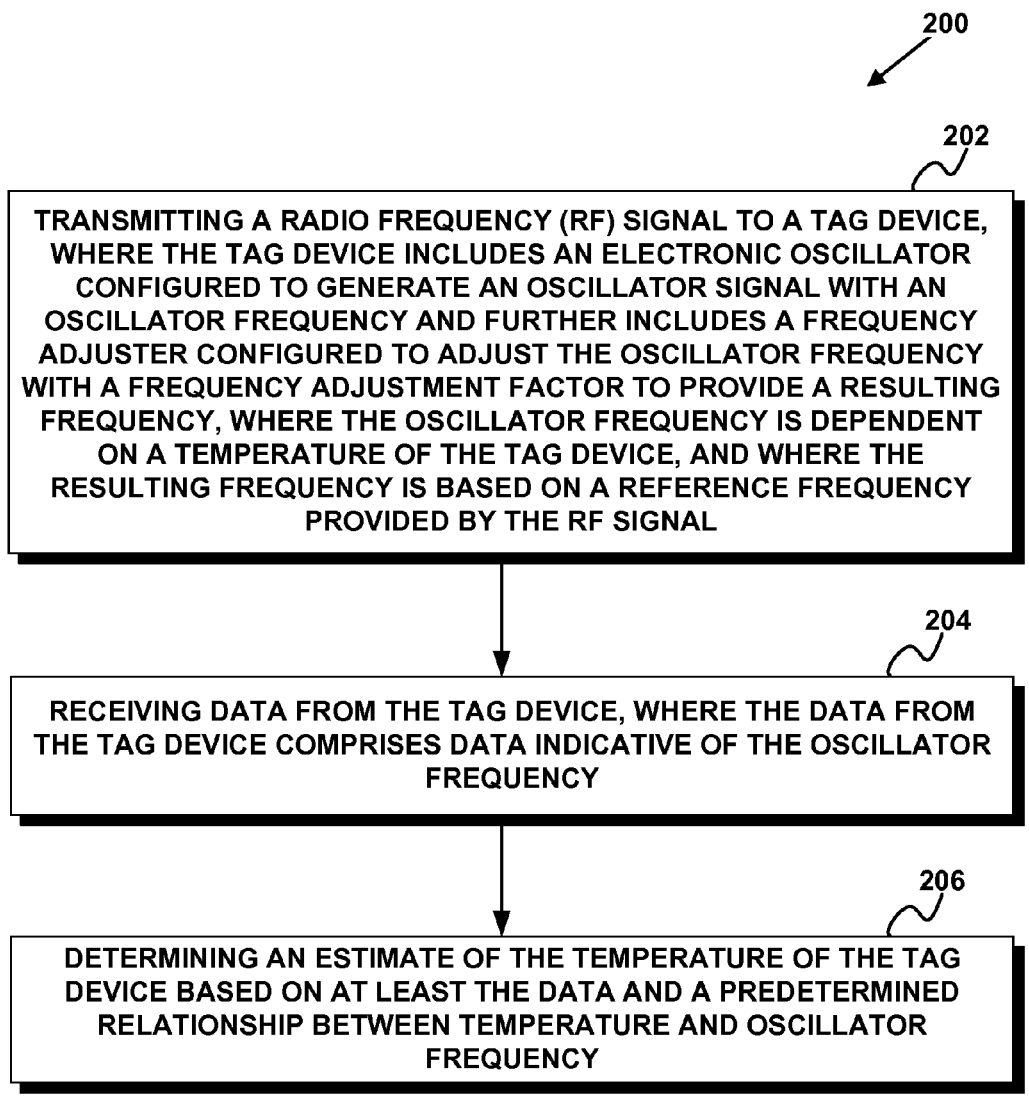
FIG. 2 is a flow chart illustrating an example method according to an example embodiment.

FIG. 2 is a flow chart illustrating an example method 200 according to an example embodiment. The example method 200 will be described hereafter in conjunction with FIG. 3, which illustrates a block diagram of a system with a reader device detecting temperatures of tag devices. The reader device may be configured similarly to the reader device 160 of FIG. 1, and the tag device(s) may be configured similarly to the tag device 110 of FIG. 1. It should be understood, however, that the example method 200 can be carried out by other devices as well, such as a laptop computer, a wearable computing device, and any aforementioned devices.

At step 202, the reader device transmits an RF signal to the tag device. As noted above, the tag device may include an electronic oscillator configured to generate an oscillator signal with an oscillator frequency, and may further include a frequency adjuster configured to adjust the oscillator frequency with a frequency adjustment factor to provide a resulting frequency. Although the frequency adjuster is described herein as a frequency divider, it should be understood that the frequency adjuster may be any type component included in the reader device configured to adjust/correct the oscillator frequency utilizing a frequency adjustment factor (e.g., a frequency divider ratio).

The oscillator frequency may be dependent on a temperature of the tag device, and the resulting frequency may be based on a reference frequency provided by the RF signal. The reference frequency transmitted by the reader device can be used by the frequency divider circuit in order to output a resulting frequency that is within a given threshold of the reference frequency, or a resulting frequency that substantially matches the reference frequency. In some examples, the reference frequency may be an internal frequency of the reader device, such as a clock frequency of the reader device, a frequency of a local oscillator of the reader device, or a frequency of another device external to the reader device. The reference frequency may be a pre-calibrated frequency.

Figure 3:
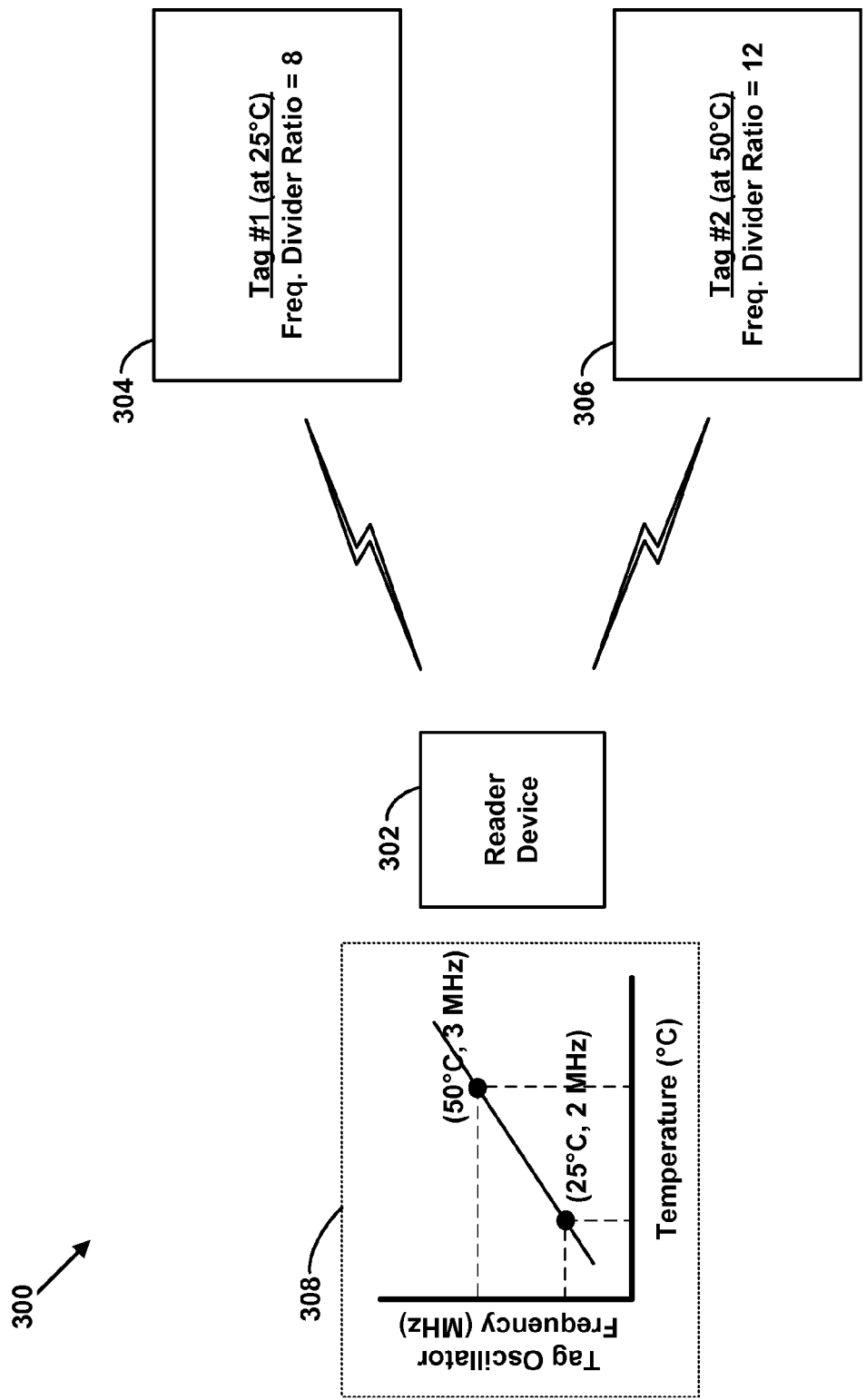
FIG. 3 is a block diagram of a system with a reader device detecting temperatures of tag devices, according to an example embodiment.

With regard to the system 300 of FIG. 3, the reader device 302 may be in communication with a first tag device 304 and a second tag device 306. The tag devices 303-306 may be RFID tags or another type of tag device. For the purposes of example, both tag devices 304-306 will be described to be in communication with the same reader device 302. However, it should be understood that in other embodiments, the first tag device 304 and the second tag device 306 may be in communication with separate reader devices.

For the system 300 shown in FIG. 3, the optimal range of frequencies for the tag devices 304-306 to operate may be between 1.5 MHz and 2.5 MHz. It should be understood that the optimal range of frequencies for tag devices may vary depending on the type of tag device, the type of electronic oscillator of the tag device, and/or other factors, such as the desired range between the reader device and the tag device (e.g., an RFID tag embedded in a contact lens may operate in the high-frequency band in communication with a reader device less than 1 meter away, or otherwise very close to the RFID tag).

In general, when a temperature of a tag device (e.g., an electronic oscillator of the tag device) changes, the oscillator frequency of the tag device may also change. In some examples, when the temperature of the tag device increases or decreases, the oscillator frequency may rise above or fall below the optimal range of frequencies for the tag device (e.g., as temperature of the tag/oscillator increases, the oscillator frequency increases). Further, in some examples, such as the examples described herein, the oscillator frequency may be within the optimal range of frequencies when the tag device is at approximately room temperature (e.g., 20-25 degrees Celsius).

In an example scenario with respect to the system 300 of FIG. 3, the first tag device 304 (optimal frequency range: 1.5 MHz-2.5 MHz) may be at a temperature of 25 degrees Celsius (° C.), and the second tag device 306 (optimal frequency range: 1.5 MHz-2.5 MHz) may be at a temperature of 50° C. Further, the oscillator frequency of the first tag device 304 may be 2 MHz (e.g., within the optimal range), and the oscillator frequency of the second tag device 306 may be 3 MHz (e.g., outside of the optimal range). At a particular point in time at which the aforementioned conditions are present, the reader device 302 may transmit a RF signal to each of the tag devices 304-306. The RF signal may include a reference frequency of approximately 250 kHz. In some embodiments, the optimal frequency range may fall anywhere between about 0.5 MHz and about 10 MHz, though other optimal frequency ranges are possible as well.

After receiving the RF signal, the frequency divider circuit of the first tag device 304 may choose a frequency ratio to divide its oscillator frequency (2 MHz) by in order to provide a resulting frequency of approximately 250 kHz. In this example, the frequency ratio may be 8 (e.g., 2 MHz/250 kHz=8). Further, after receiving the RF signal, the frequency divider circuit of the second tag device 306 may choose a frequency ratio to divide its oscillator frequency (3 MHz) by in order to provide a resulting frequency of approximately 250 kHz. In this example, the frequency ratio may be 12 (e.g., 3 MHz/250 kHz=12). In some embodiments, the resulting frequency may not be approximately the same as the reference frequency, and may rather be within a given range of frequencies (e.g., ±a percent error of the reference frequency).

Referring back to FIG. 2, at step 204, the reader device receives data from the tag device. The data may comprise data indicative of the frequency ratio. In FIG. 3, for example, the reader device 302 may receive data from each of the tag devices 304-306 indicative of the respective frequency ratios and/or oscillator frequencies of the tag devices 304-306. In some embodiments, the reader device 302 may receive the data (and/or other information) from the tag devices 304-306 by transmitting the RF signal to the tag devices 304-306 (e.g., a continuous-wave signal), where the RF signal includes the reference frequency. The tag devices 304-306 can then respond to the RF signal by modulating the reflection coefficients of their respective antennas, thereby backscattering a response signal to the reader device 302, where the response signal includes the data. Other embodiments are also possible.

At step 206, the reader device (or other device) determines an estimate of the temperature of the tag device based on at least the data and a predetermined relationship (e.g., correlation) between temperature and oscillator frequency. In some examples, the predetermined relationship may take the form of a calibration curve stored in memory at the reader device. Further, in order to define the predetermined relationship, the tag device and/or electronic oscillator may need to be calibrated at room temperature so as to determine an oscillator frequency at room temperature to use as a reference for if/when the oscillator frequency changes with temperature. In some examples, a one-time calibration of the tag device may provide a sufficient predetermined relationship. In other examples, a two-point calibration of the tag device may provide a more accurate predetermined relationship. Other examples of defining the predetermined relationship are also possible.

In the scenario with respect to the system 300 of FIG. 3, the reader device 302 may estimate the respective temperatures of the tag devices 304-306 based on a calibration curve 308 stored in memory at the reader device 302. As shown, the calibration curve 308 may include a linear relationship between oscillator frequency and temperature. In some embodiments, the calibration curve 308 may include a linear relationship between frequency ratio and temperature. Non-linear relationships are possible as well, and other calibration curves are also possible. In some examples, prior to estimating the respective temperatures, the reader device 302 may be configured to calculate/estimate the oscillator frequencies of the tag devices 304-306 by multiplying the reference frequency by the frequency ratios received from the tag devices 304-306. Other examples of calculating/estimating the oscillator frequencies are possible as well.

The reader device 302 may be configured to compare the received data from the tag devices 304-306 with the calibration curve 308 in order to infer the respective temperature of the tag devices 304-306. For example, at an oscillator frequency of approximately 2 MHz, the calibration curve 308 may indicate that the corresponding temperature may be approximately 25° C. Further, at an oscillator frequency of approximately 3 MHz, the calibration curve 308 may indicate that the corresponding temperature may be approximately 50° C. Thus, the reader device 302 may determine an estimated (or exact) reading of the respective temperatures of the tag devices 304-306.

Figure 4:
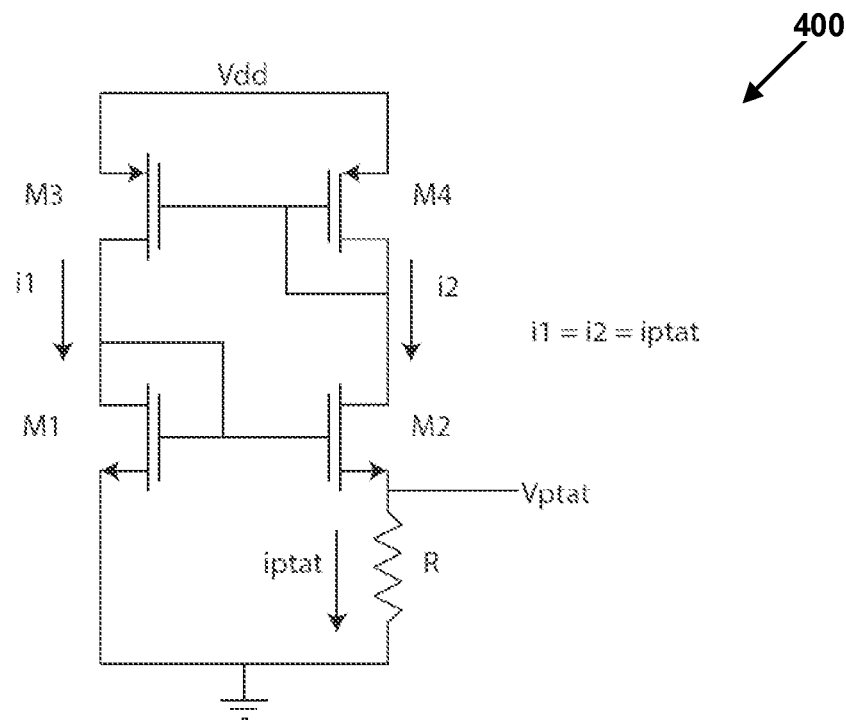
FIG. 4 is a simplified circuit diagram of an example current source and electronic oscillator, according to an example embodiment.
Figure 4:
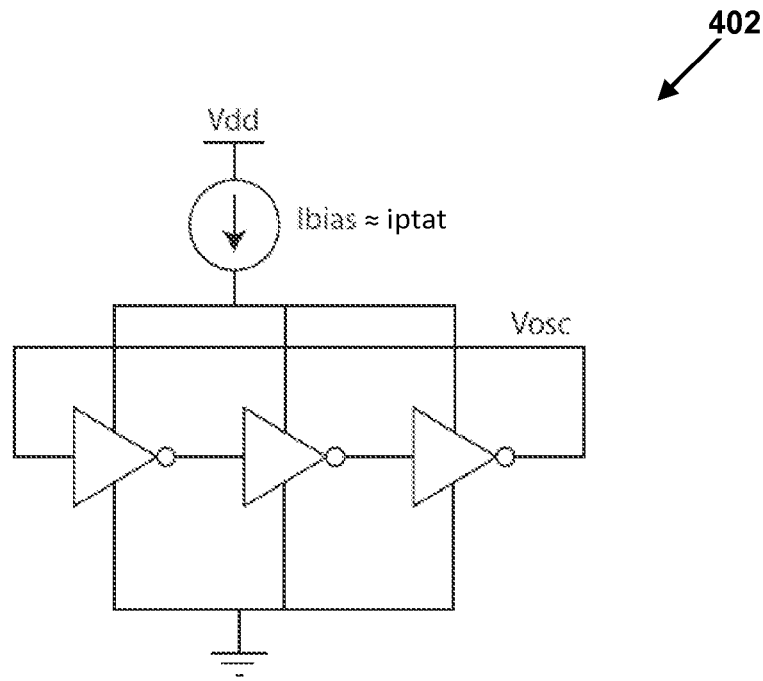

FIG. 4 is a simplified circuit diagram of an example current source 400 and electronic oscillator 402, according to an example embodiment. As shown in FIG. 4, the current source 400 may be a proportional-to-absolute-temperature (PTAT) current generator. Further, the electronic oscillator 402 may be a ring oscillator powered by a bias current, $I_{bias}$, and increasing the bias current may increase the oscillator voltage, $V_{osc}$, thus increasing the oscillator frequency. Other types and combinations of current sources and electronic oscillators are also possible. In some embodiments, the tag device may include the current source 400. Additionally or alternatively to the current source 400, the tag device may be coupled to an external current source, in other embodiments.

The current source 400 may be configured to generate a current (e.g., $I_{ptat}$) for the ring oscillator 402, and, in some scenarios, the ring oscillator 402 can be configured to oscillate at a frequency of the current. Further, in some examples, the current generated by the PTAT current generator, $I_{ptat}$, may be related to the bias current, $I_{bias}$. For instance, as shown in FIG. 4, the bias current that powers the ring oscillator 402, $I_{bias}$, may be approximately equal to the current supplied by the PTAT current generator, $I_{ptat}$.

The current source 400 can be configured such that the supplied current increases as the temperature of the tag device increases (e.g., the current being proportional to the temperature). Thus, the predetermined relationship used by the reader device to estimate the temperature of the tag device can be a calibrated relationship between the temperature of the tag device and the current generated by the current source 400 (e.g., $I_{ptat}$ and/or $I_{bias}$). As such, the reader device may be configured to receive data from the tag device indicative of the current generated by the current source, and/or data indicative of other information related to the current. In similar embodiments, the reader device may only be configured to receive data indicative of the frequency ratio rather than data indicative of the current generated by the current source 400, though the frequency ratio and oscillator frequency may depend on the current.

In some embodiments, the reader device may be configured to receive data from the tag device indicative of a threshold voltage of the electronic oscillator (e.g., a bias voltage), and/or data indicative of other information related to the threshold voltage of the electronic oscillator. As such, the predetermined relationship used by the reader device to estimate the temperature of the tag device can be a calibrated relationship between the temperature of the tag device and the threshold voltage of the electronic oscillator. In similar embodiments, the reader device may only be configured to receive data indicative of the frequency ratio rather than data indicative of the threshold voltage of the electronic oscillator, though the frequency ratio and the oscillator frequency may depend on the threshold voltage.

In some embodiments, transistors included in the electronic oscillator (or a current source, such as the current source 400 of FIG. 4) may include one or more high frequency transistors (e.g., a high-electron-mobility transistor), and may be configured such that the temperature of the tag device can be estimated by the reader device based on electron mobility of the electronic oscillator. In such embodiments, the oscillator frequency (or other factor) may be based on the electron mobility of the electronic oscillator. Further, the reader device may be configured to receive data from the tag device indicative of the electron mobility of the electronic oscillator, and/or data indicative of other information related to the electron mobility of the electronic oscillator, such as drift velocity and scattering time (e.g., scattering increases when temperature increases). As such, the predetermined relationship used by the reader device to estimate the temperature of the tag device can be a calibrated relationship between the temperature of the tag device and the electron mobility of the electronic oscillator. In similar embodiments, the reader device may only be configured to receive data indicative of the frequency ratio rather than data indicative of the electron mobility of the electronic oscillator, though the frequency ratio and the oscillator frequency may depend on the electron mobility.

IV. Embedding a Tag Device in a Contact Lens

As noted above, a tag device, such as an RFID tag, can be embedded in an eye-mountable device, which may be worn on the eye as a contact lens. Further, the tag device may be in RF communication with a reader device so as to enable the reader device to estimate a temperature of the tag device and/or eye-mountable device.

Figure 5A:
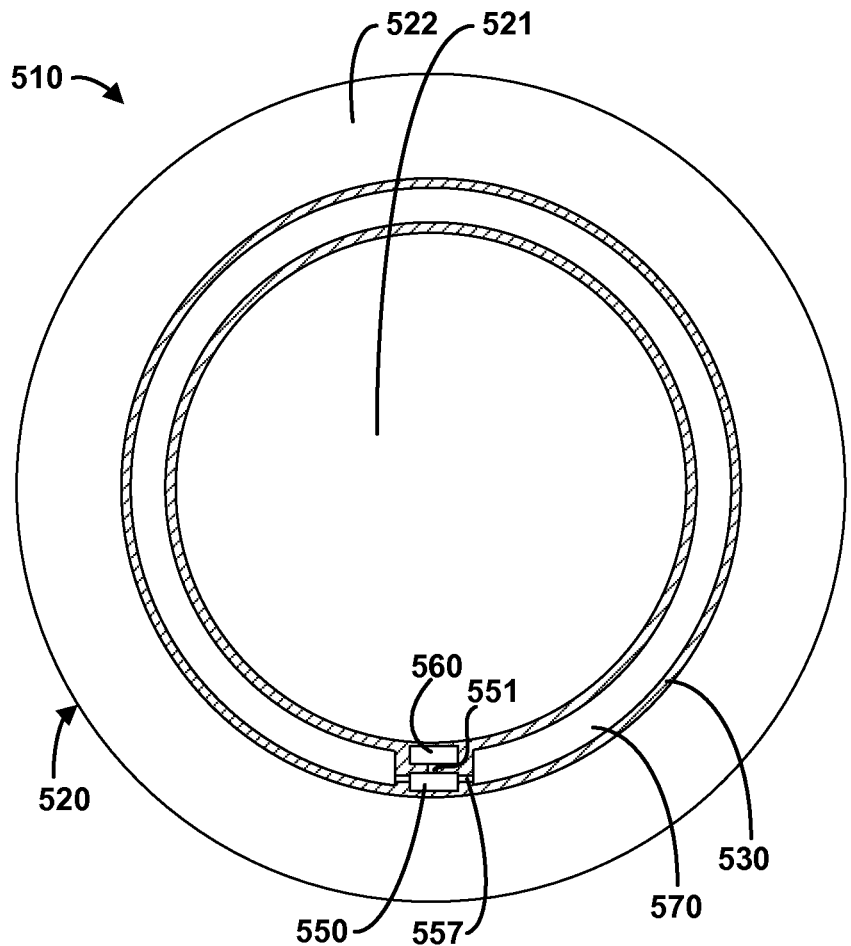
FIGS. 5A-5B are views of an example eye-mountable device, according to an example embodiment.
Figure 5B:
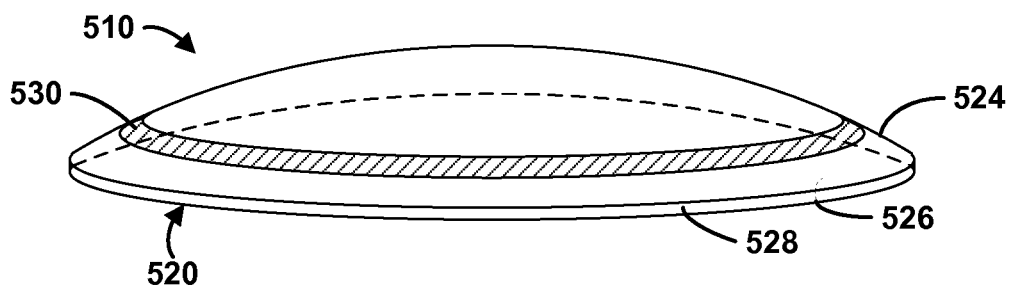

FIG. 5A is a bottom view of an example eye-mountable device 510 (or ophthalmic electronics platform), and FIG. 5B is a side view of the example eye-mountable device 510. It is noted that relative dimensions in FIGS. 5A and 5B are not necessarily to scale, but have been rendered for purposes of explanation only in describing the arrangement of the example eye-mountable device 510.

The eye-mountable device 510 is formed of a polymeric material 520 shaped as a curved disk. The polymeric material 520 can be a substantially transparent material to allow incident light to be transmitted to the eye while the eye-mountable device 510 is mounted to the eye. The polymeric material 520 can be a biocompatible material similar to those employed to form vision correction and/or cosmetic contact lenses in optometry, such as polyethylene terephthalate ("PET"), polymethyl methacrylate ("PMMA"), polyhydroxyethylmethacrylate ("polyHEMA"), silicone hydrogels, combinations of these, etc. The polymeric material 520 can be formed with one side having a concave surface 526 suitable to fit over a corneal surface of an eye. The opposite side of the disk can have a convex surface 524 that does not interfere with eyelid motion while the eye-mountable device 510 is mounted to the eye. A circular outer side edge 528 connects the concave surface 524 and convex surface 526.

The eye-mountable device 510 can have dimensions similar to a vision correction and/or cosmetic contact lenses, such as a diameter of approximately 1 centimeter, and a thickness of about 0.1 to about 0.5 millimeters. However, the diameter and thickness values are provided for explanatory purposes only. In some embodiments, the dimensions of the eye-mountable device 510 can be selected according to the size and/or shape of the corneal surface of the wearer's eye.

The polymeric material 520 can be formed with a curved shape in a variety of ways. For example, techniques similar to those employed to form vision-correction contact lenses, such as heat molding, injection molding, spin casting, etc. can be employed to form the polymeric material 520. While the eye-mountable device 510 is mounted in an eye, the convex surface 524 faces outward to the ambient environment while the concave surface 526 faces inward, toward the corneal surface. The convex surface 524 can therefore be considered an outer, top surface of the eye-mountable device 510 whereas the concave surface 526 can be considered an inner, bottom surface. The "bottom" view shown in FIG. 5A is facing the concave surface 526. From the bottom view shown in FIG. 5A, the outer periphery 522, near the outer circumference of the curved disk is curved to extend out of the page, whereas the central region 521, near the center of the disk is curved to extend into the page.

A substrate 530 is embedded in the polymeric material 520. The substrate 530 can be embedded to be situated along the outer periphery 522 of the polymeric material 520, away from the central region 521. The substrate 530 does not interfere with vision because it is too close to the eye to be in focus and is positioned away from the central region 521 where incident light is transmitted to the eye-sensing portions of the eye. Moreover, the substrate 530 can be formed of a transparent material to further mitigate effects on visual perception.

The substrate 530 can be shaped as a flat, circular ring (e.g., a disk with a centered hole). The flat surface of the substrate 530 (e.g., along the radial width) is a platform for mounting electronics such as chips (e.g., via flip-chip mounting) and for patterning conductive materials (e.g., via microfabrication techniques such as photolithography, deposition, plating, etc.) to form electrodes, antenna(e), and/or interconnections. The substrate 530 and the polymeric material 520 can be approximately cylindrically symmetric about a common central axis. The substrate 530 can have, for example, a diameter of about 10 millimeters, a radial width of about 1 millimeter (e.g., an outer radius 1 millimeter greater than an inner radius), and a thickness of about 50 micrometers. However, these dimensions are provided for example purposes only, and in no way limit the present disclosure. The substrate 530 can be implemented in a variety of different form factors.

In some examples, the substrate 530 may include a tag device. As such, components of the tag device may also be disposed on the embedded substrate 530. For instance, a loop antenna 570, a controller 550, and temperature-sensing electronics 560 (e.g., an electronic oscillator and a frequency divider circuit), such as those described with respect to FIG. 1, can be disposed on the embedded substrate 530. The controller 550 can be a chip including logic elements configured to operate the temperature-sensing electronics 560 and the loop antenna 570. The controller 550 is electrically connected to the loop antenna 570 by interconnects 557 also situated on the substrate 530. Similarly, the controller 550 is electrically connected to the temperature-sensing electronics 560 by an interconnect 551. The interconnects 551, 557, the loop antenna 570, as well as other components can be formed from conductive materials patterned on the substrate 530 by a process for precisely patterning such materials, such as deposition, photolithography, etc. The conductive materials patterned on the substrate 530 can be, for example, gold, platinum, palladium, titanium, carbon, aluminum, copper, silver, silver-chloride, conductors formed from noble materials, metals, combinations of these, etc. The controller 550 and temperature-sensing electronics 560 can also be implemented as a single chip, rather than two separate connected components.

As shown in FIG. 5A, which is a view facing the concave surface 526 of the eye-mountable device 510, the temperature-sensing electronics 560 are mounted to a side of the substrate 530 facing the concave surface 526. In general, any electronics, electrodes, etc. situated on the substrate 530 can be mounted to either the "inward" facing side (e.g., situated closest to the concave surface 526) or the "outward" facing side (e.g., situated closest to the convex surface 524). Moreover, in some embodiments, some electronic components can be mounted on one side of the substrate 530, while other electronic components are mounted to the opposing side, and connections between the two can be made through conductive materials passing through the substrate 530.

The loop antenna 570 is a layer of conductive material patterned along the flat surface of the substrate to form a flat conductive ring. In some instances, the loop antenna 570 can be formed without making a complete loop. For instances, the loop antenna 570 can have a cutout to allow room for the controller 550 and temperature-sensing electronics 560, as illustrated in FIG. 5A. However, the loop antenna 570 can also be arranged as a continuous strip of conductive material that wraps entirely around the flat surface of the substrate 530 one or more times. For example, a strip of conductive material with multiple windings can be patterned on the side of the substrate 530 opposite the controller 550 and temperature-sensing electronics 560. Interconnects between the ends of such a wound antenna (e.g., the antenna leads) can then be passed through the substrate 530 to the controller 550.

V. Conclusion

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

We claim:

1. A method, comprising:
   transmitting, by a reader device, a radio frequency (RF) signal to a tag device, wherein the tag device includes an electronic oscillator configured to generate an oscillator signal with an oscillator frequency and further includes a frequency adjuster configured to adjust the oscillator frequency with a frequency adjustment factor to provide a resulting frequency, wherein the oscillator frequency is dependent on a temperature of the tag device, and wherein the resulting frequency is based on a reference frequency provided by the RF signal;

receiving, by the reader device, data from the tag device, wherein the data from the tag device comprises data indicative of the oscillator frequency; and determining, by the reader device, an estimate of the temperature of the tag device based on at least the data and a predetermined relationship between temperature and oscillator frequency.

2. The method of claim 1, wherein the frequency adjuster is a frequency divider, wherein the frequency adjustment factor is a frequency ratio, and wherein the frequency divider is configured to divide the oscillator frequency by the frequency ratio to provide the resulting frequency.

3. The method of claim 2, wherein the data indicative of the oscillator frequency includes the frequency ratio.

4. The method of claim 1, wherein the frequency adjuster is configured to adjust the oscillator frequency with the frequency adjustment factor such that the resulting frequency matches the reference frequency.

5. The method of claim 1, wherein the electronic oscillator includes a relaxation oscillator.

6. The method of claim 1, wherein the electronic oscillator includes a ring oscillator.

7. The method of claim 1, wherein the oscillator frequency is within a defined oscillator frequency range, wherein the defined oscillator frequency range includes frequencies between about 0.5 megahertz and about 10 megahertz.

8. The method of claim 1, wherein the estimate of the temperature of the tag device is further based on a threshold voltage of the electronic oscillator.

9. The method of claim 1, wherein the tag device is embedded in a contact lens.

10. A computing device, comprising:
a radio frequency (RF) transceiver unit;
at least one processor; and
a memory, wherein the memory stores instructions that upon execution by the at least one processor cause the computing device to perform operations comprising:
transmitting, via the RF transceiver unit, a RF signal to a tag device, wherein the tag device includes an electronic oscillator configured to generate an oscillator signal with an oscillator frequency and further includes a frequency adjuster configured to adjust the oscillator frequency with a frequency adjustment factor to provide a resulting frequency, wherein the oscillator frequency is dependent on a temperature of the tag device, and wherein the resulting frequency is based on a reference frequency provided by the RF signal,
receiving, via the RF transceiver unit, data from the tag device, wherein the data from the tag device comprises data indicative of the oscillator frequency, and
determining an estimate of the temperature of the tag device based on at least the data and a predetermined relationship between temperature and oscillator frequency.

11. The computing device of claim 10, wherein the tag device includes a current source configured to generate a current, and wherein the oscillator frequency generated by the electronic oscillator is related to the current generated by the current source.

12. The computing device of claim 11, wherein the predetermined relationship between temperature and oscillator frequency is based on a predetermined relationship between temperature and the current generated by the current source.

13. The computing device of claim 10, wherein the predetermined relationship between temperature and oscillator frequency is based on a predetermined relationship between temperature and electron mobility in a component of the electronic oscillator.

14. The computing device of claim 13, wherein the component of the electronic oscillator is a high-frequency transistor.

15. The computing device of claim 10, wherein the electronic oscillator includes a ring oscillator.

16. The computing device of claim 10, wherein the data indicative of the oscillator frequency include the frequency adjustment factor.

17. A non-transitory computer readable medium having stored therein instructions executable by a computing device to cause the computing device to perform functions, the functions comprising:
transmitting a radio frequency (RF) signal to a tag device, wherein the tag device includes an electronic oscillator configured to generate an oscillator signal with an oscillator frequency and further includes a frequency adjuster configured to adjust the oscillator frequency with a frequency adjustment factor to provide a resulting frequency, wherein the oscillator frequency is dependent on a temperature of the tag device, and wherein the resulting frequency is based on a reference frequency provided by the RF signal;
receiving data from the tag device, wherein the data from the tag device comprises data indicative of the oscillator frequency; and
determining an estimate of the temperature of the tag device based on at least the data and a predetermined relationship between temperature and oscillator frequency.

18. The non-transitory computer readable medium of claim 17, wherein the frequency adjuster is a frequency divider, wherein the frequency adjustment factor is a frequency ratio, and wherein the frequency divider is configured to divide the oscillator frequency by the frequency ratio to provide the resulting frequency.

19. The non-transitory computer readable medium of claim 17, wherein the frequency adjuster is configured to adjust the oscillator frequency with the frequency adjustment factor such that the resulting frequency matches the reference frequency.

20. The non-transitory computer readable medium of claim 17, wherein transmitting the radio frequency (RF) signal to the tag device comprises transmitting the radio frequency (RF) signal to the tag device using a radio-frequency identification (RFID) protocol.

* * * * *